US012693496B2

(12) United States Patent
Chai

(10) Patent No.: US 12,693,496 B2
(45) Date of Patent: Jul. 28, 2026

(54) 4P LENS FOR SCANNER GUN WITH LONG DEPTH OF FIELD

(71) Applicant: Hubei Huaxin Photoelectric Co., Ltd., Yichang (CN)

(72) Inventor: Keyu Chai, Yichang (CN)

(73) Assignee: Hubei Huaxin Photoelectric Co., Ltd., Yichang (CN)

( * ) Notice: Subject to any disclaimer, the term of this patent is extended or adjusted under 35 U.S.C. 154(b) by 320 days.

(21) Appl. No.: 18/538,208

(22) Filed: Dec. 13, 2023

(65) Prior Publication Data

US 2024/0255730 A1     Aug. 1, 2024

(30) Foreign Application Priority Data

Jan. 28, 2023     (CN) .......................... 202310097965.6

(51) Int. Cl.
G02B 9/34          (2006.01)
(52) U.S. Cl.
CPC ...................................... G02B 9/34 (2013.01)
(58) Field of Classification Search
CPC ................................ G02B 9/34; G02B 13/004

USPC ......................................... 359/771, 781, 783
See application file for complete search history.

(56) References Cited

U.S. PATENT DOCUMENTS

2011/0249171 A1 * 10/2011 Shigemitsu .......... G02B 13/004
348/340
2019/0107689 A1 * 4/2019 Huang ................. G02B 13/004

* cited by examiner

*Primary Examiner* — Travis S Fissel
(74) *Attorney, Agent, or Firm* — JEEN IP LAW, LLC

(57) ABSTRACT

A 4P lens for scanner gun with a long depth of field, comprising a first lens, a second lens, an aperture stop, a third lens and a fourth lens along the optical axis from the object side to the image side, the first lens is a negative lens, with a convex surface facing the object side and a concave surface facing the image side, the second lens is a positive lens, with a convex surface facing the object side, and the third lens is a positive lens, with a concave surface facing the object side and a convex surface facing the image side, the fourth lens is a positive lens, with a concave surface facing the object side and a convex surface facing the image side; the focal length of the first lens is f1, and the total focal length of the lens is f, which meets following condition: 1.4<f1/f<1.7.

3 Claims, 15 Drawing Sheets

L1      L2      L3      L4

L2

L3

L1

L4

4P LENS FOR SCANNER GUN WITH LONG DEPTH OF FIELD

CROSS-REFERENCE TO RELATED APPLICATIONS

This application claims priority to Chinese Patent Application No. 202310097965.6, filed on Jan. 28, 2023, which is hereby incorporated by reference in its entirety.

TECHNICAL FIELD

The present application relates to the field of optics, and more specifically, to a 4P lens for scanner gun with long depth of field.

BACKGROUND

Scanner guns have developed rapidly since their birth in the 1980s. Pictures, photos, films, and various drawings, graphics, and documents can be input into computers using scanner guns, and then can be processed, managed, used, stored, or output by computers.

However, the resolution and clarity of pictures, photos or various drawings and graphics scanned by current scanner gun are not high enough and need to be improved.

SUMMARY

In view of the technical problems existing in the prior art, the present application provides a 4P lens for scanner gun with a long depth of field, which comprises a first lens, a second lens, an aperture stop, a third lens and a fourth lens along the optical axis from the object side to the image side, wherein the first lens is a positive lens, with a convex surface facing the object side and a concave surface facing the image side, the second lens is a positive lens, with a convex surface facing the object side, and the third lens is a negative lens, with a concave surface facing the object side and a convex surface facing the image side, the fourth lens is a negative lens, with a concave surface facing the object side and a convex surface facing the image side;

wherein a focal length of the first lens is f1, and a total focal length of the lens is f, which meets a following condition:

$$1.4 < f1/f < 1.7.$$

On the basis of the above technical solution, the present application can also make the following improvements.

In an implementation mode of the present application, a combined focal length of the third lens and the fourth lens is f34 and a following condition is met between it and the total focal length of the lens:

$$0.06 < |f/f34| < 1.11.$$

In an implementation mode of the present application, a following condition is met between a core thickness P3 of the third lens and the total focal length f of the lens:

$$0.11 < P3/f < 0.15.$$

In an implementation mode of the present application, a following condition is met between a core thickness P4 of the fourth lens and the total focal length f of the lens:

$$0.16 < P4/f < 0.17.$$

In an implementation mode of the present application, a distance from the first lens to the image side is a total optical length TTL of the lens, and a following condition is met between the total optical length TTL and the core thickness 1P4 of the fourth lens:

$$0.11 < P4/TTL < 0.12.$$

In an implementation mode of the present application, a radius of curvature of the first surface of the third lens is P3R1, and the following conditions are satisfied between it and the total focal length f of the lens:

$$0.33 < P3R1/f < 0.38.$$

The lens provided by the application uses four lenses to effectively reduce chromatic aberration and aberration. The designed lens has a small aperture, so the resolution is higher, the image is clear, the performance is better, and the work efficiency is improved.

DESCRIPTION OF EMBODIMENTS

In order to make the purpose, technical solutions and advantages of the embodiments of the present application clearer, the technical solutions in the embodiments of the present application will be clearly and completely described below in conjunction with the drawings in the embodiments of the present application. Obviously, the described embodiments are some, but not all, of the embodiments of the present application. Based on the embodiments of the present application, all other embodiments obtained by those of ordinary skill in the art without creative efforts fall within the scope of protection of the present application. In addition, the technical features of various embodiments or single embodiments provided by the present application can be arbitrarily combined with each other to form a feasible technical solution. This combination is not restricted by the sequence of steps and/or structural composition mode, but must be in the form of It is based on what a person of ordinary skill in the art can realize. When the combination of technical solutions appears to be contradictory or cannot be realized, it should be considered that such combination of technical solutions does not exist and is not within the protection scope required by the present application.

Figure 1:
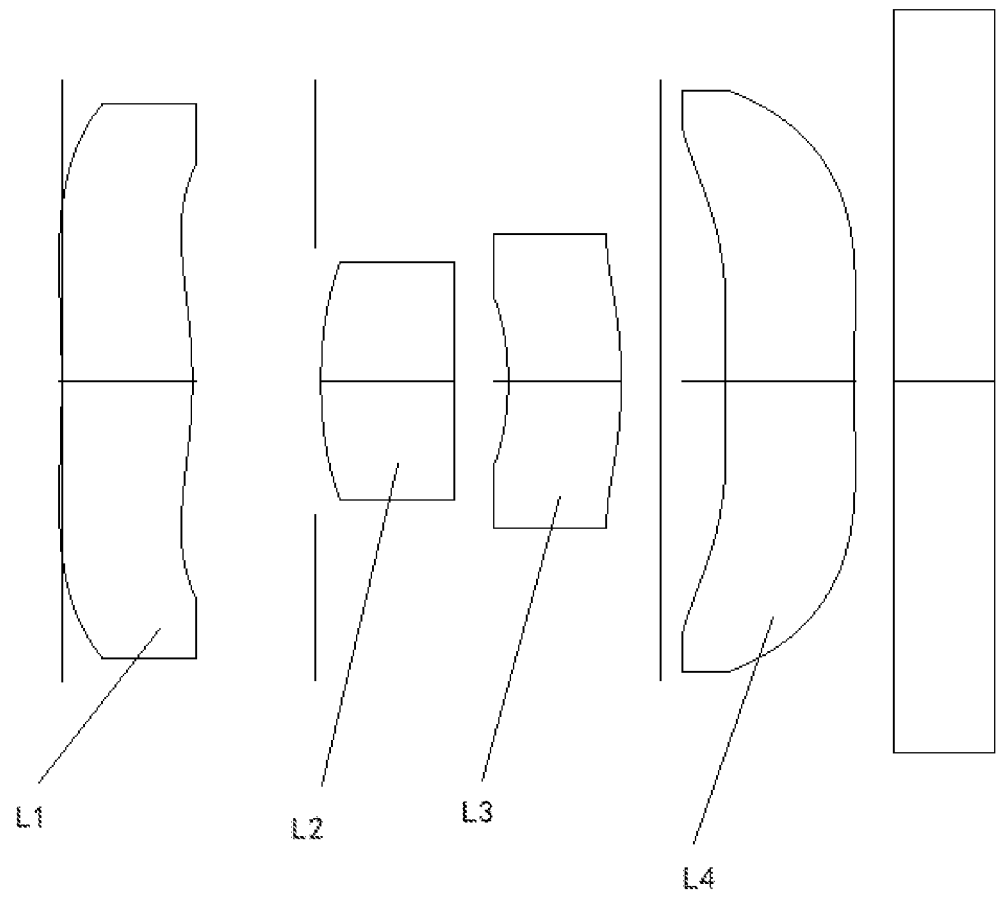
FIG. 1 is a schematic structural diagram of a 4P lens for scanner gun with long depth of field according to the first embodiment of the present application.

Based on the problems in the background technology, FIG. 1 provides a 4P lens for scanner gun with long depth of field, it comprises a first lens, a second lens, an aperture stop, a third lens and a fourth lens along the optical axis from the object side to the image side, wherein the first lens is a positive lens, with a convex surface facing the object side and a concave surface facing the image side, the second lens is a positive lens, with a convex surface facing the object side, and the third lens is a negative lens, with a concave surface facing the object side and a convex surface facing the image side, the fourth lens is a negative lens, with a concave surface facing the object side and a convex surface facing the image side.

It can be understood that the lens for scanner gun provided by the present application uses four lenses. Along the optical axis from the object side to the image side, the elements are arranged in the following order: the first lens (L1), the second lens (L2), the aperture stop (STOP), the third lens (L3) and the fourth lens (L4).

Wherein, the first lens (L1) is a negative lens, with a convex surface facing the object side and a concave surface facing the image side. The second lens (L2) is a positive lens, with a convex surface facing the object side. The third lens (L3) is a positive lens, with a concave surface facing the object side and a convex surface facing the image side. The fourth lens (L4) is a positive lens, with a concave surface facing the object side and a convex surface facing the image side.

Define the focal length of the first lens (L1) as f1, the combined focal length of the third lens (L3) and the fourth lens (L4) as f34, the total focal length of the lens as f, the core thickness of the third lens (L3) as P3, and the core thickness of the fourth lens (L4) as P4, the distance from the first lens to the image side is the total optical length of the lens TTL, and the radius of curvature of the first surface of the third lens is P3R1.

The above parameters meet the following conditions:

$$1.4 < f1/f < 1.7; 0.06 < |f/f34| < 1.11; 0.11 < P3/f < 0.15;$$

$$0.16 < P4/f < 0.17; 0.11 < P4/TTL < 0.12; 0.33 < P3R1/f < 0.38.$$

Wherein, the lens data of the scanner gun lens according the first embodiment is as follows in Table 1.

TABLE 1

| Surface | | | | | Material | | |
|---|---|---|---|---|---|---|---|
| serial number | Element | Surface type | Radius of curvature | Thickness | Type | Refractive index | Abbe number |
| 0 | Object surface | Flat | | 250 | | | |
| 1 | First lens | Aspherical | −6.8195 | 0.6531 | Plastic | 1.53 | 55.69 |
| 2 | | Aspherical | −2.2738 | 0.6167 | | | |
| 3 | Aperture | Flat | | 0.0260 | | | |
| 4 | Second lens | Aspherical | 2.3955 | 0.6701 | Plastic | 1.53 | 55.69 |
| 5 | | Aspherical (Stop surface) | −36.0069 | 0.2670 | | | |
| 6 | Third lens | Aspherical | −1.3911 | 0.5656 | Plastic | 1.66 | 20.41 |
| 7 | | Aspherical | −2.2243 | 0.2000 | | | |
| 8 | Aperture | Flat | | 0.3226 | | | |
| 9 | Fourth lens | Aspherical | 13.3195 | 0.6425 | Plastic | 1.53 | 55.69 |
| 10 | | Aspherical | 7.2017 | 0.2000 | | | |
| 11 | Filter | Flat | | 0.5000 | Glass | 1.52 | 64.16 |
| 12 | | Flat | | 0.3704 | | | |
| 13 | Image surface | Flat | | 1.0863 | | | |

The conditions satisfied by the optical parameters of the first lens to the fourth lens are as follows in Table 2.

TABLE 2

| f= | 4 | TTL= | 5.7498 |
|---|---|---|---|
| P3= | 0.5656 | P4= | 0.6425 |
| P3R1= | −1.3911 | F34= | −37.9353 |

L1$s$1 is the object surface of the first lens, L1$s$2 is the image surface of the first lens, L2$s$1 is the object surface of the second lens, L2$s$2 is the image surface of the second lens, L3$s$1 is the object surface of the third lens, L3$s$2 is the third lens The image surface of L4$s$1 is the object surface of the fourth lens, and L4$s$2 is the image surface of the fourth lens.

The cone coefficient k and aspheric coefficient A4-A16 of the object surface and image surface of the first lens L1 to the fourth lens are shown in Table 3.

TABLE 3

| | Surface serial number | | | | | | | |
|---|---|---|---|---|---|---|---|---|
| Surface name | 1 L1 s1 | 2 L1 s2 | 3 L2 s1 | 4 L2 s2 | 5 L3 s1 | 6 L3 s2 | 7 L4 s1 | 8 L4 s2 |
| K | −7.60E+01 | −1.61E+01 | 9.86E+00 | −1.44E+06 | −8.36E−01 | −1.98E+00 | 6.79E+01 | −1.17E+02 |
| A4 | 8.51E−02 | −1.43E−02 | 1.40E−02 | −1.19E−02 | 7.94E−03 | −2.81E−03 | 4.21E−04 | 8.51E−02 |
| A6 | 1.20E−01 | 1.03E−02 | −1.76E−02 | 2.29E−02 | −5.58E−03 | −1.10E−03 | 8.05E−04 | 1.20E−01 |
| A8 | 2.41E−01 | −1.01E+00 | 2.63E+00 | −5.54E+00 | 6.28E−01 | 2.06E+01 | −3.38E+01 | 2.41E−01 |
| A10 | −9.71E−01 | 3.24E+01 | −5.31E+02 | −5.07E+02 | 1.20E+05 | −1.34E+06 | 4.70E+06 | −9.71E−01 |
| A12 | −1.34E−01 | −3.88E−01 | 3.81E+00 | −2.25E+01 | −3.03E+02 | 2.79E+03 | −7.68E+03 | −1.34E−01 |
| A14 | 8.44E−03 | 2.46E−01 | 2.33E−01 | −2.74E−01 | −3.13E−01 | 2.37E−01 | 1.87E−03 | 8.44E−03 |
| A16 | −2.72E−01 | 8.48E−02 | 3.73E−02 | −1.04E−02 | −1.67E−02 | 1.09E−02 | −2.09E−03 | −2.72E−01 |

Figure 2:
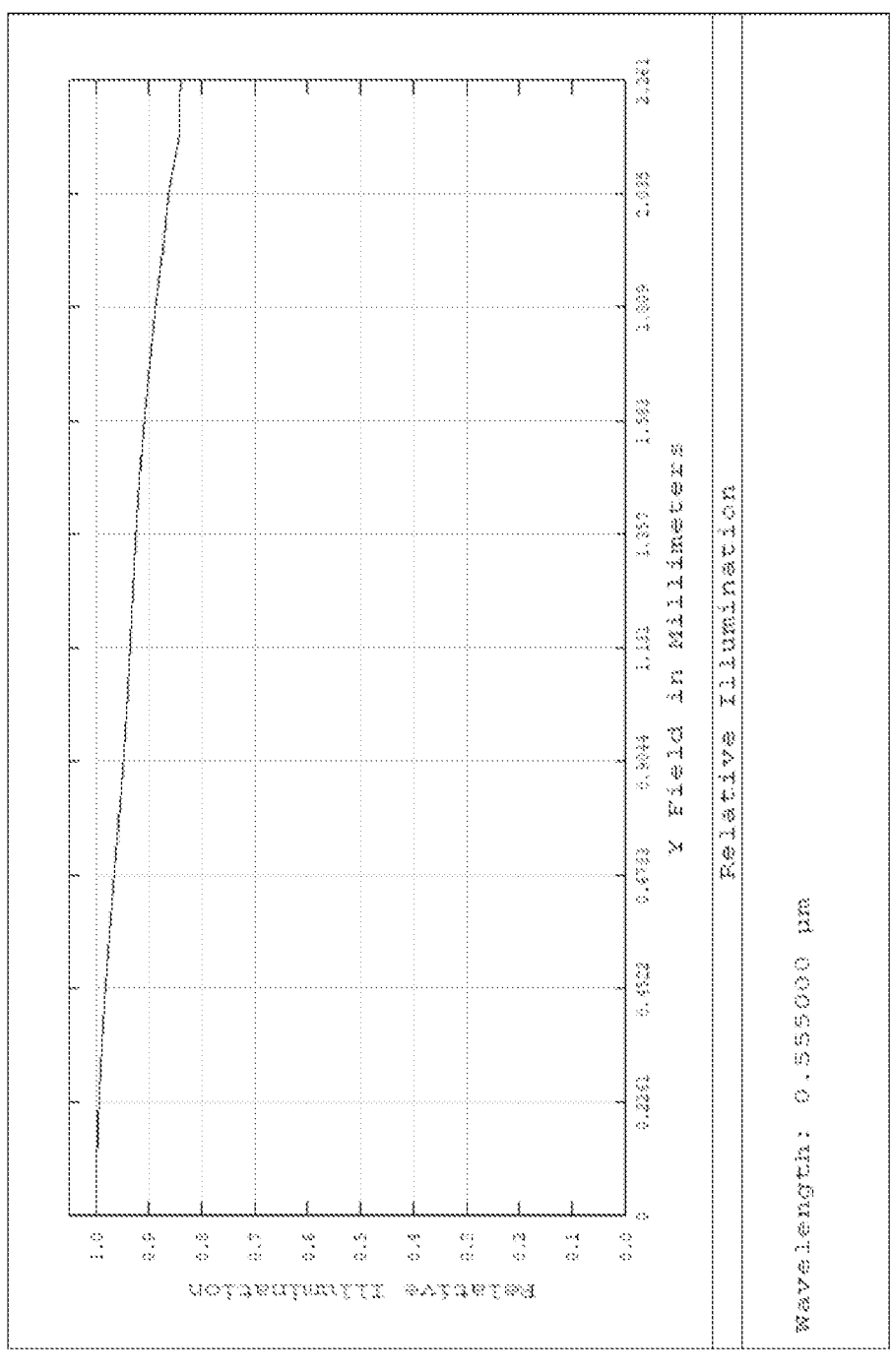
FIG. 2 is a relative illumination diagram of a 4P lens for scanner gun with long depth of field according to the first embodiment.
Figure 3:
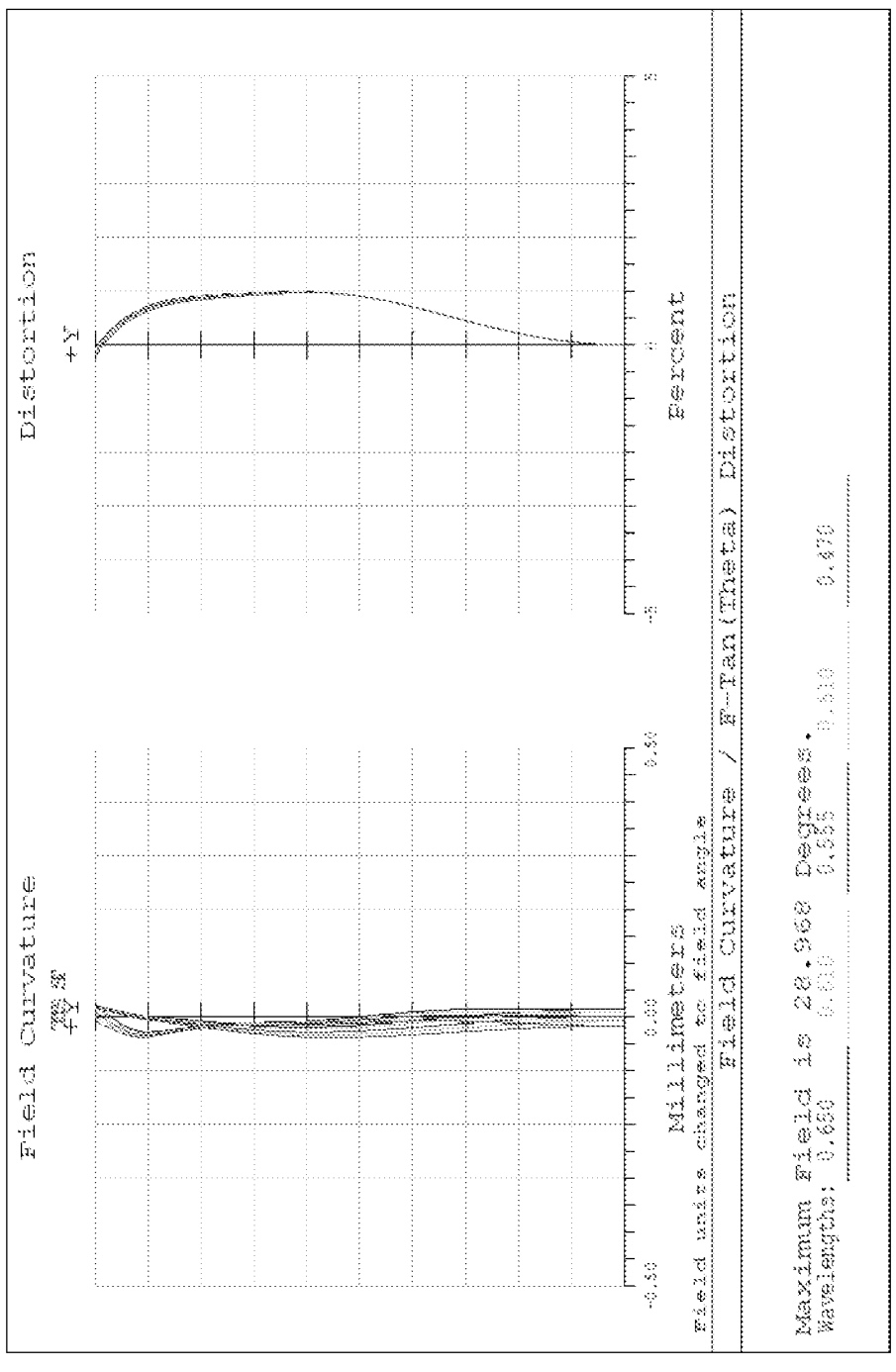
FIG. 3 is a schematic diagram of field curvature and distortion of a 4P lens for scanner gun with long depth of field according to the first embodiment.
Figure 4:
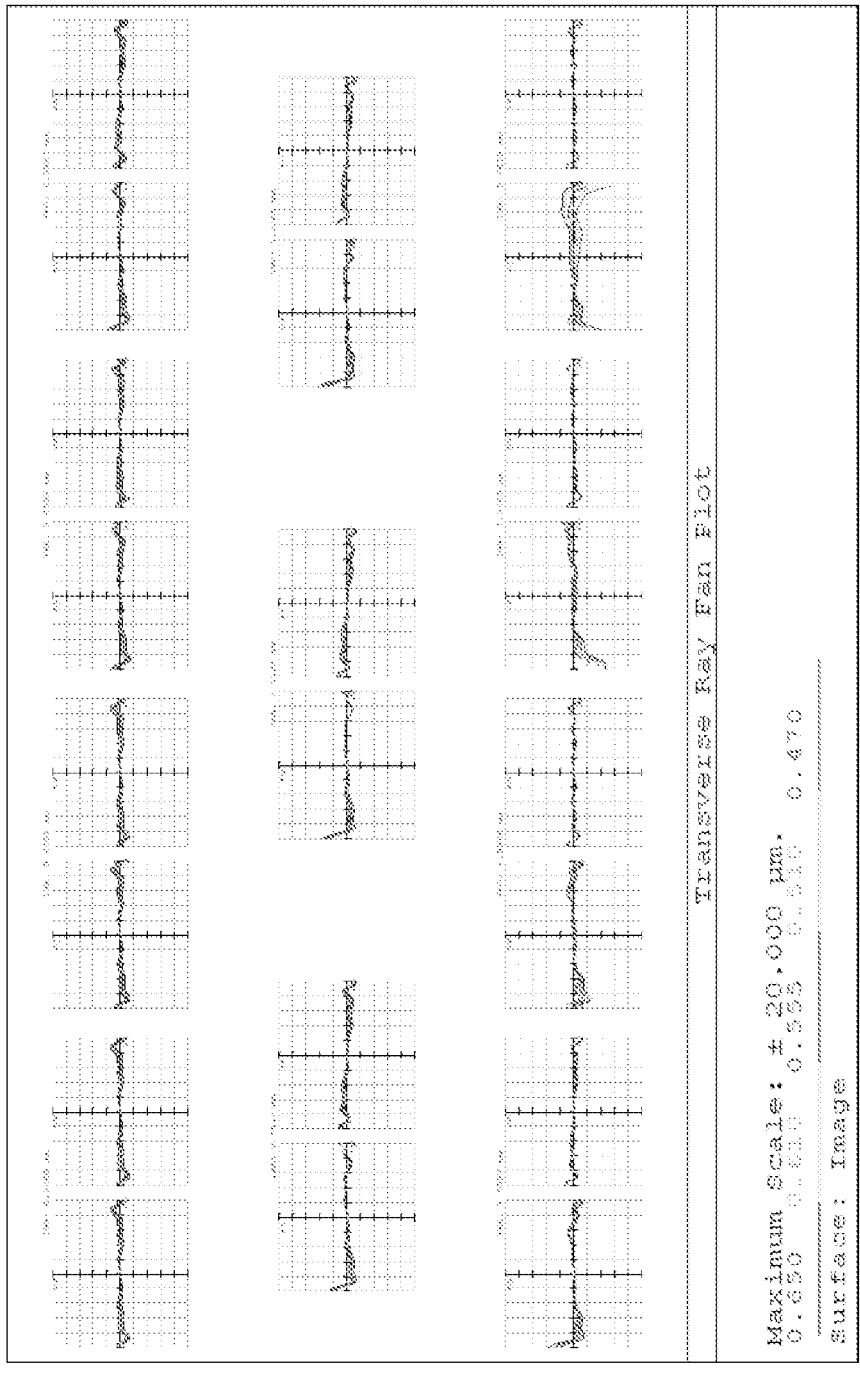
FIG. 4 is a Ray fan diagram of a 4P lens for scanner gun with long depth of field according to the first embodiment.
Figure 5:
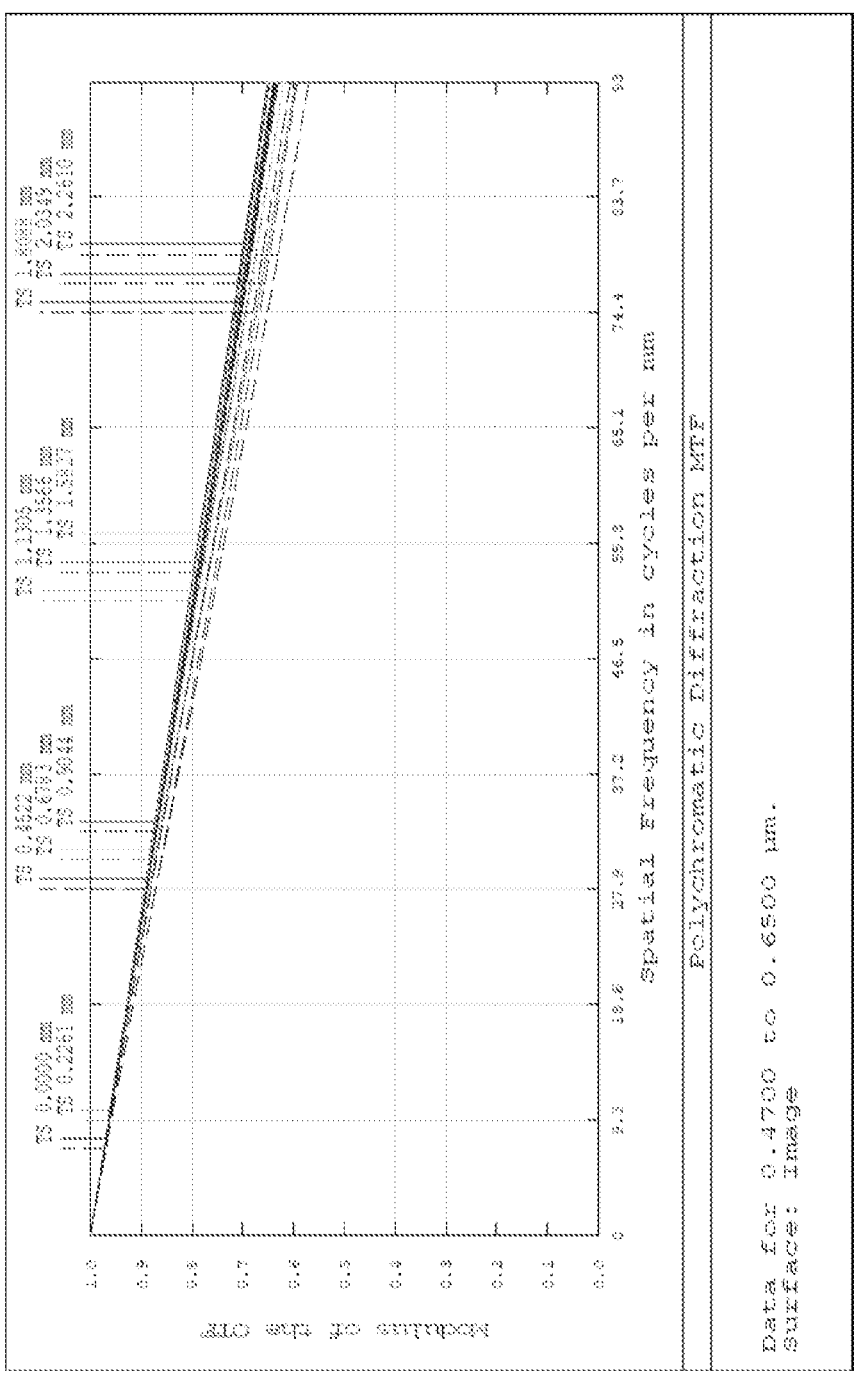
FIG. 5 is a MTF curve chart of a 4P lens for scanner gun with long depth of field according to the first embodiment at different frequencies.

FIG. 2 is a relative illumination diagram of a lens for scanner gun with long depth of field according to the first embodiment. The higher the value, the better the relative illumination. FIG. 3 is a schematic diagram of field curvature and distortion of a lens for scanner gun with long depth of field according to the first embodiment. The left side is field curvature and the right side is distortion. The closer to the center, the better the imaging effect. FIG. 4 is a Ray fan diagram of a lens for scanner gun with long depth of field according to the first embodiment The smaller the value, the better the imaging effect. FIG. 5 is a MTF curve chart of a lens for scanner gun with long depth of field according to the first embodiment at different frequencies. The smoother the curve and the higher the value, the better the imaging effect of the lens.

Figure 6:
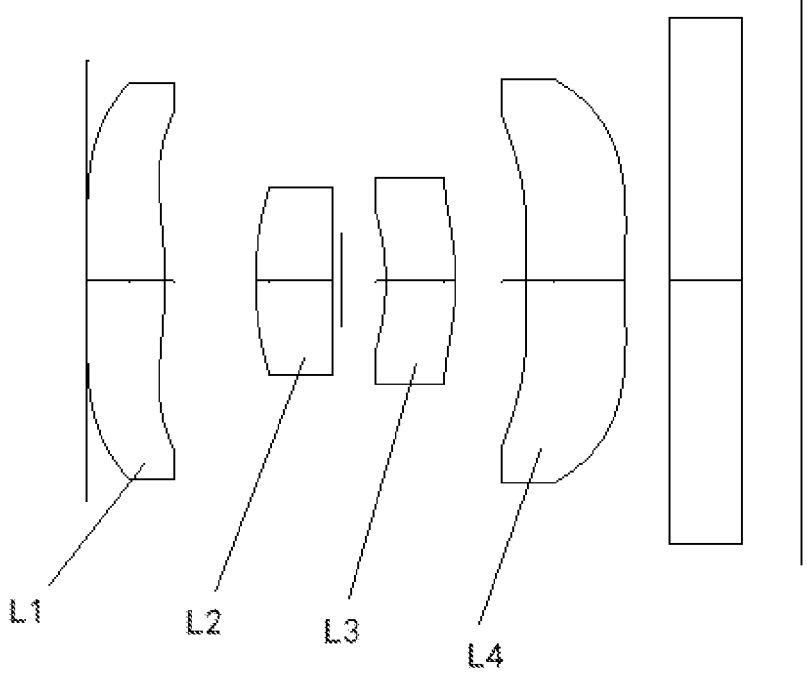
FIG. 6 is a schematic structural diagram of a 4P lens for scanner gun with long depth of field according to the second embodiment of the present application.

Wherein, FIG. 6 is a schematic structural diagram of a lens for scanner gun with a long depth of field according the second embodiment. The structure is the same as that of the first embodiment. The difference lies in: the lens data, cone coefficients, aspheric coefficients of each lens and the conditions met by the optical parameters are different.

The lens data of the scanner gun lens according to the second embodiment is as shown in Table 4.

TABLE 4

| Surface serial number | Element | Surface type | Radius of curvature | Thickness | Material Type | Refractive index | Abbe number |
|---|---|---|---|---|---|---|---|
| 0 | Object surface | Flat | | 250 | | | |
| 1 | First lens | Aspherical | −14.2338 | 0.5308 | Plastic | 1.54 | 55.71 |
| 2 | | Aspherical | −2.6119 | 0.6179 | | | |
| 3 | Second lens | Aspherical | 2.6239 | 0.5187 | Plastic | 1.54 | 55.99 |
| 4 | | Aspherical | 7.8256 | 0.0705 | | | |
| 5 | Aperture | Flat | | 0.3000 | | | |
| 6 | Third lens | Aspherical | −1.5078 | 0.4748 | Plastic | 1.64 | 23.53 |
| 7 | | Aspherical | −1.8994 | 0.4821 | | | |
| 8 | Fourth lens | Aspherical | 12.5626 | 0.6762 | Plastic | 1.54 | 55.71 |
| 9 | | Aspherical | 8.6917 | 0.3000 | | | |
| 10 | Filter | Flat | | 0.5000 | Glass | 1.52 | 64.17 |
| 11 | | Flat | | 1.2505 | | | |
| 12 | Image surface | Flat | | 0 | | | |

Wherein, the conditions satisfied by the optical parameters of the first lens to the fourth lens are as follows Table 5 below.

TABLE 5

| f= | 4.1625 | TTL= | 5.7214 |
|---|---|---|---|
| P3 | 0.4748 | P4 | 0.6762 |
| P3R1= | −1.5078 | F34= | −77.5891 |

The cone coefficient k and aspheric coefficient A4-A16 of the object surface and image surface of the first lens L1 to the fourth lens are shown in Table 6.

TABLE 6

| | Surface serial number | | | | | | | |
|---|---|---|---|---|---|---|---|---|
| Surface name | 1 L1 s1 | 2 L1 s2 | 3 L2 s1 | 4 L2 s2 | 5 L3 s1 | 6 L3 s2 | 7 L4 s1 | 8 L4 s2 |
| K | −4.10E+02 | −2.26E+01 | 1.07E+01 | 0.00E+00 | −4.42E+00 | −3.61E+00 | 6.97E+01 | −1.41E+02 |
| A4 | 9.86E−02 | −1.08E−02 | 1.48E−02 | −1.19E−02 | 7.72E−03 | −2.91E−03 | 4.00E−04 | 9.86E−02 |
| A6 | 1.21E−01 | 1.76E−02 | −1.72E−02 | 1.79E−02 | −1.20E−02 | −3.49E−03 | 2.93E−03 | 1.21E−01 |
| A8 | 1.95E−01 | −8.42E−01 | 2.32E+00 | −6.09E+00 | 6.17E−01 | 2.17E+01 | −2.65E+01 | 1.95E−01 |
| A10 | 4.46E−03 | −5.29E−01 | −1.38E+00 | 3.78E+00 | 0.00E+00 | 0.00E+00 | 0.00E+00 | 4.46E−03 |
| A12 | −4.06E−02 | 6.96E−02 | 4.04E−01 | −8.14E−02 | −1.66E+01 | −4.98E+01 | −1.64E+02 | −4.06E−02 |
| A14 | 1.28E−02 | 3.51E−01 | 3.66E−01 | −5.13E−01 | −6.84E−01 | 5.10E−01 | −1.76E−01 | 1.28E−02 |
| A16 | −2.78E−01 | 9.12E−02 | 3.91E−02 | −1.09E−02 | −1.73E−02 | 1.08E−02 | −2.21E−03 | −2.78E−01 |

Figure 7:
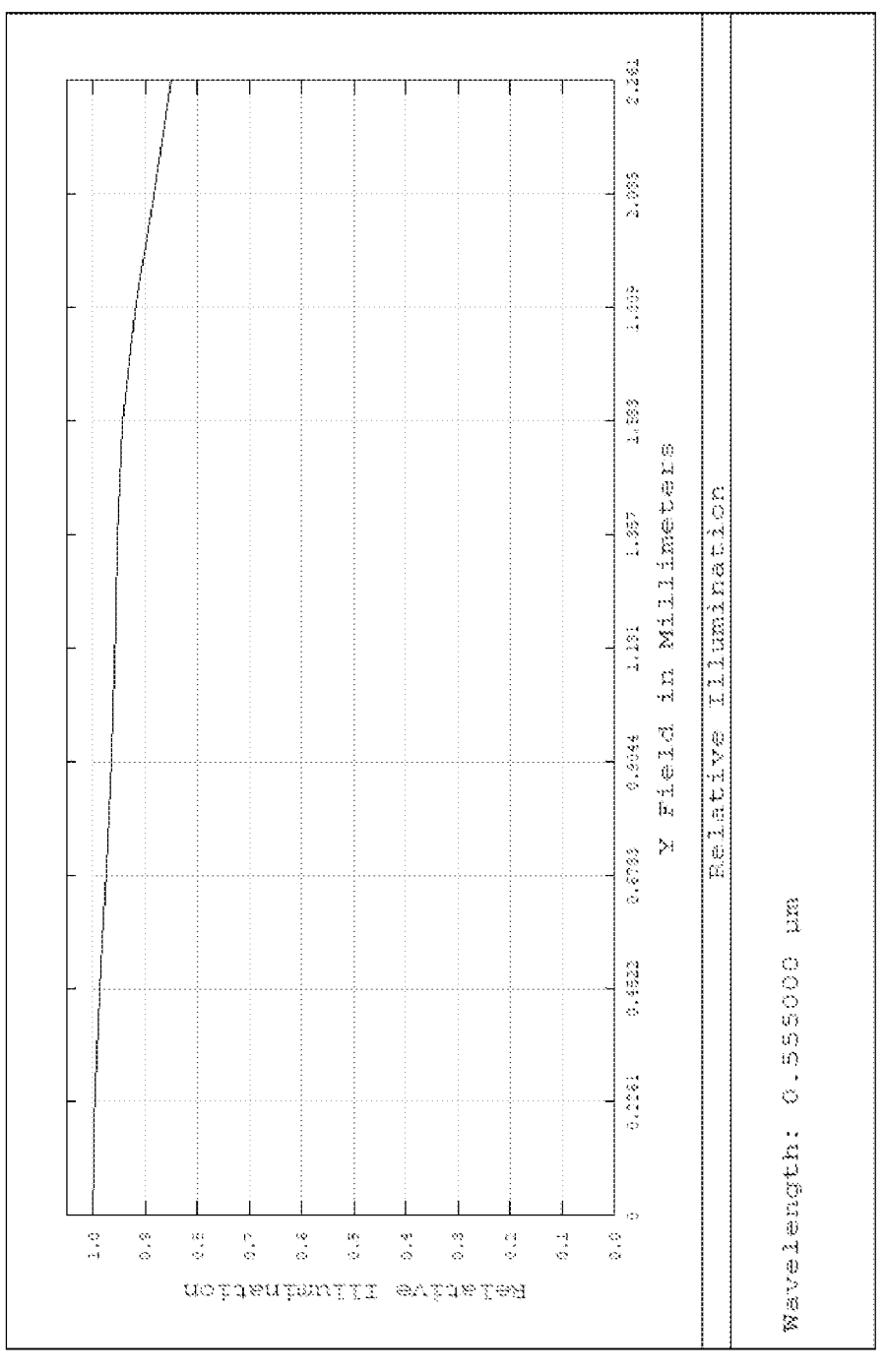
FIG. 7 is a relative illumination diagram of a 4P lens for scanner gun with long depth of field according to the second embodiment.
Figure 8:
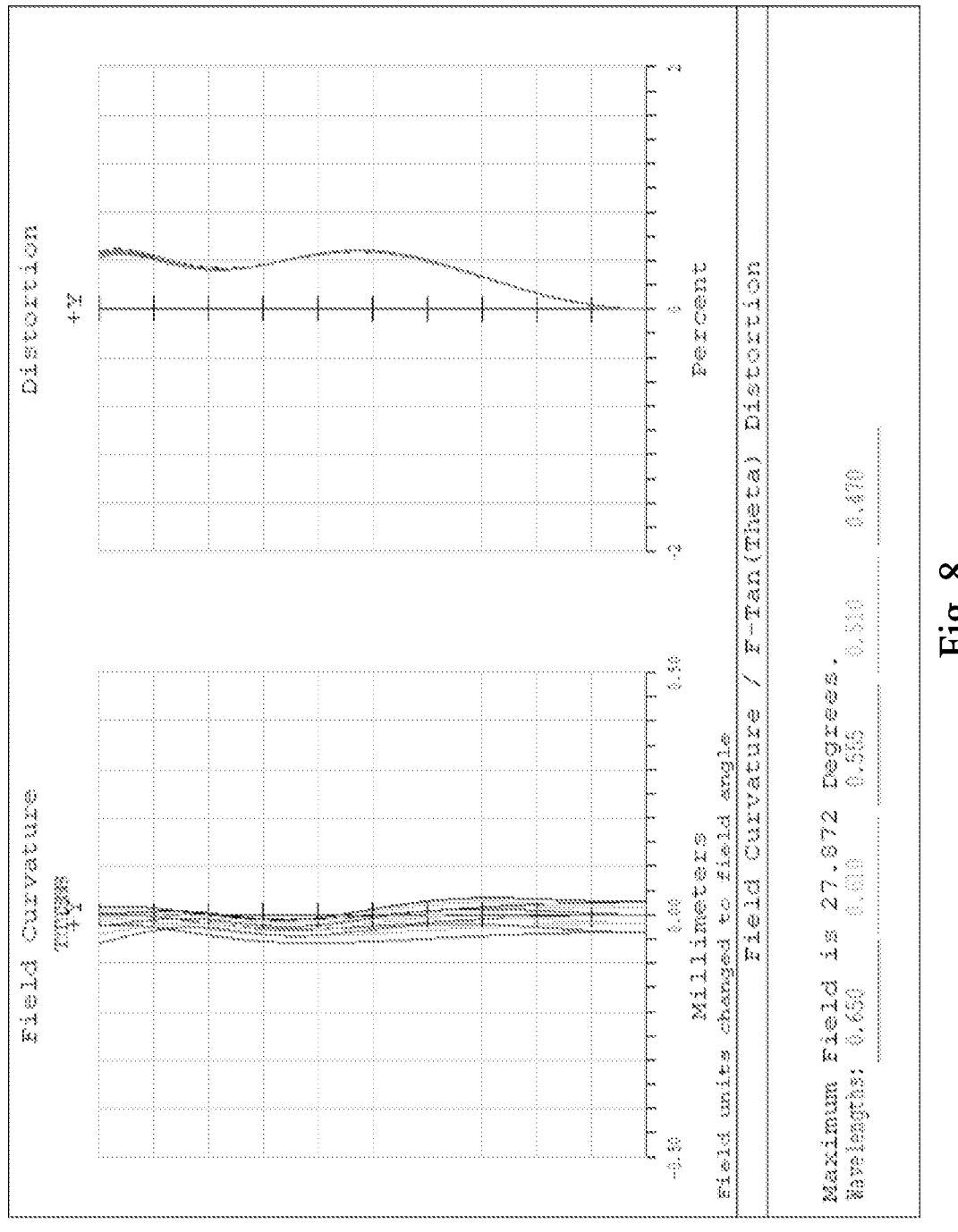
FIG. 8 is a schematic diagram of field curvature and distortion of a 4P lens for scanner gun with long depth of field according to the second embodiment.
Figure 9:
FIG. 9 is a Ray fan diagram of a 4P lens for scanner gun with long depth of field according to the second embodiment.
Figure 10:
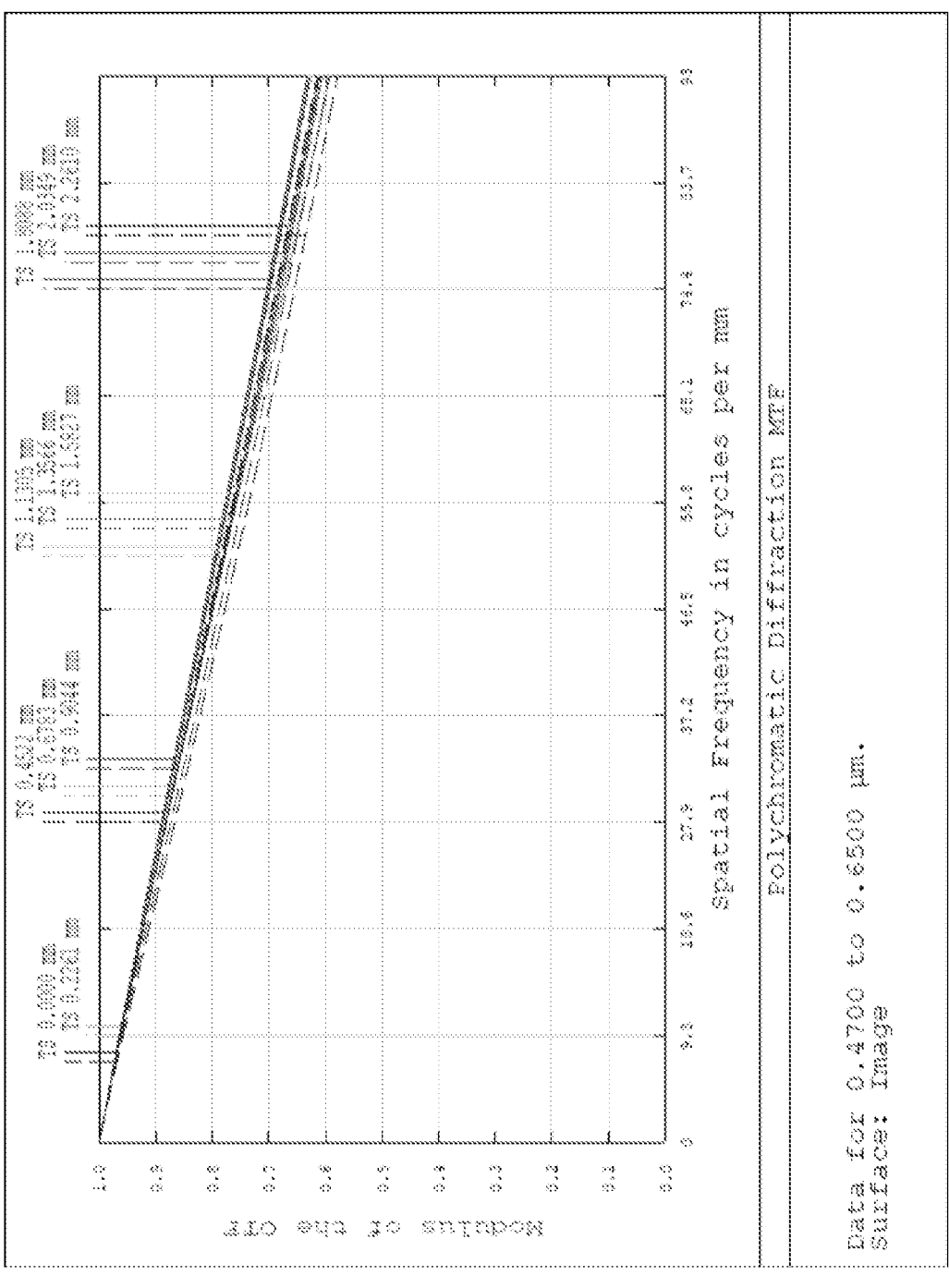
FIG. 10 is a MTF curve chart of a 4P lens for scanner gun with long depth of field according to the second embodiment at different frequencies.

FIG. 7 is a relative illumination diagram of a lens for scanner gun with long depth of field according to the second embodiment. The higher the value, the better the relative illumination. FIG. 8 is a schematic diagram of field curvature and distortion of a lens for scanner gun with long depth of field according to the second embodiment. The left side is field curvature and the right side is distortion. The closer to the center, the better the imaging effect. FIG. 9 is a Ray fan diagram of a lens for scanner gun with long depth of field according to the second embodiment The smaller the value, the better the imaging effect. FIG. 10 is a MTF curve chart of a lens for scanner gun with long depth of field according to the first embodiment at different frequencies. The smoother the curve and the higher the value, the better the imaging effect of the lens.

Figure 11:
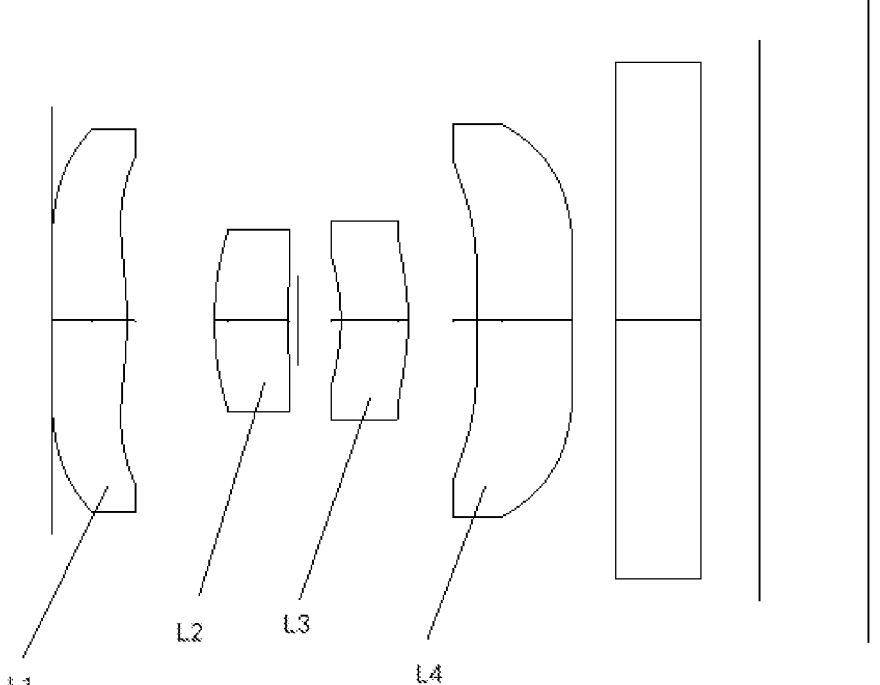
FIG. 11 is a schematic structural diagram of a 4P lens for scanner gun with long depth of field according to the third embodiment of the present application.

Wherein, FIG. 11 is a schematic structural diagram of a 4P lens for scanner gun with long depth of field according to the third embodiment. The structure is the same as that of the first embodiment and the second embodiment. The difference lies in: the lens data, cone coefficients, aspheric coefficients of each lens and the conditions met by the optical parameters are different.

The lens data of the scanner gun lens according to the third embodiment is as shown in Table 7.

TABLE 7

| Surface | | | | | Material | | |
|---|---|---|---|---|---|---|---|
| serial number | Element | Surface type | Radius of curvature | Thickness | Type | Refractive index | Abbe number |
| 0 | Object surface | Flat | | 250 | | | |
| 1 | First lens | Aspherical | −14.2338 | 0.5308 | Plastic | 1.54 | 55.7 |
| 2 | | Aspherical | −2.6120 | 0.6179 | | | |
| 3 | Second lens | Aspherical | 2.6239 | 0.5187 | Plastic | 1.54 | 55.99 |
| 4 | | Aspherical | 7.8256 | 0.0705 | | | |
| 5 | Aperture | Flat | 0 | 0.3000 | | | |
| 6 | Third lens | Aspherical | −1.5078 | 0.4748 | Plastic | 1.64 | 23.53 |
| 7 | | Aspherical | −1.8994 | 0.4821 | | | |
| 8 | Fourth lens | Aspherical | 12.5626 | 0.6762 | Plastic | 1.54 | 55.7 |
| 9 | | Aspherical | 8.6916 | 0.3000 | | | |
| 10 | Filter | Flat | | 0.6100 | Glass | 1.52 | 64.17 |
| 11 | | Flat | | 1.1780 | | | |
| 12 | Image surface | Flat | | 0 | | | |

Wherein, the conditions satisfied by the optical parameters of the first lens to the fourth lens are as follows Table 8 below.

TABLE 8

| f= | 4.1625 | TTL= | 5.7590 |
|---|---|---|---|
| P3= | 0.4748 | P4= | 0.6762 |
| P3R1= | −1.5078 | F34= | −77.5890 |

The cone coefficient k and aspheric coefficient A4-A16 of the object surface and image surface of the first lens L1 to the fourth lens are shown in Table 9.

TABLE 9

| | Surface serial number | | | | | | | |
|---|---|---|---|---|---|---|---|---|
| Surface name | 1<br>L1 s1 | 2<br>L1 s2 | 3<br>L2 s1 | 4<br>L2 s2 | 5<br>L3 s1 | 6<br>L3 s2 | 7<br>L4 s1 | 8<br>L4 s2 |
| K | −4.10E+02 | −2.26E+01 | 1.07E+01 | 0.00E+00 | 0.00E+00 | −4.42E+00 | −3.61E+00 | 6.97E+01 |
| A4 | 9.86E−02 | −1.08E−02 | 1.48E−02 | −1.19E−02 | 7.72E−03 | −2.91E−03 | 4.00E−04 | 9.86E−02 |
| A6 | 1.21E−01 | 1.76E−02 | −1.72E−02 | 1.79E−02 | −1.20E−02 | −3.49E−03 | 2.93E−03 | 1.21E−01 |
| A8 | 1.95E−01 | −8.42E−01 | 2.32E+00 | −6.09E+00 | 6.17E−01 | 2.17E+01 | −2.65E+01 | 1.95E−01 |
| A10 | 4.46E−03 | −5.29E−01 | −1.38E+00 | 3.78E+00 | 0.00E+00 | 0.00E+00 | 0.00E+00 | 4.46E−03 |
| A12 | −4.06E−02 | 6.96E−02 | 4.04E−01 | −8.14E−02 | −1.66E+01 | −4.98E+01 | −1.64E+02 | −4.06E−02 |
| A14 | 1.28E−02 | 3.51E−01 | 3.66E−01 | −5.13E−01 | −6.84E−01 | 5.10E−01 | −1.76E−01 | 1.28E−02 |
| A16 | −2.78E−01 | 9.12E−02 | 3.91E−02 | −1.09E−02 | −1.73E−02 | 1.08E−02 | −2.21E−03 | −2.78E−01 |

Figure 12:
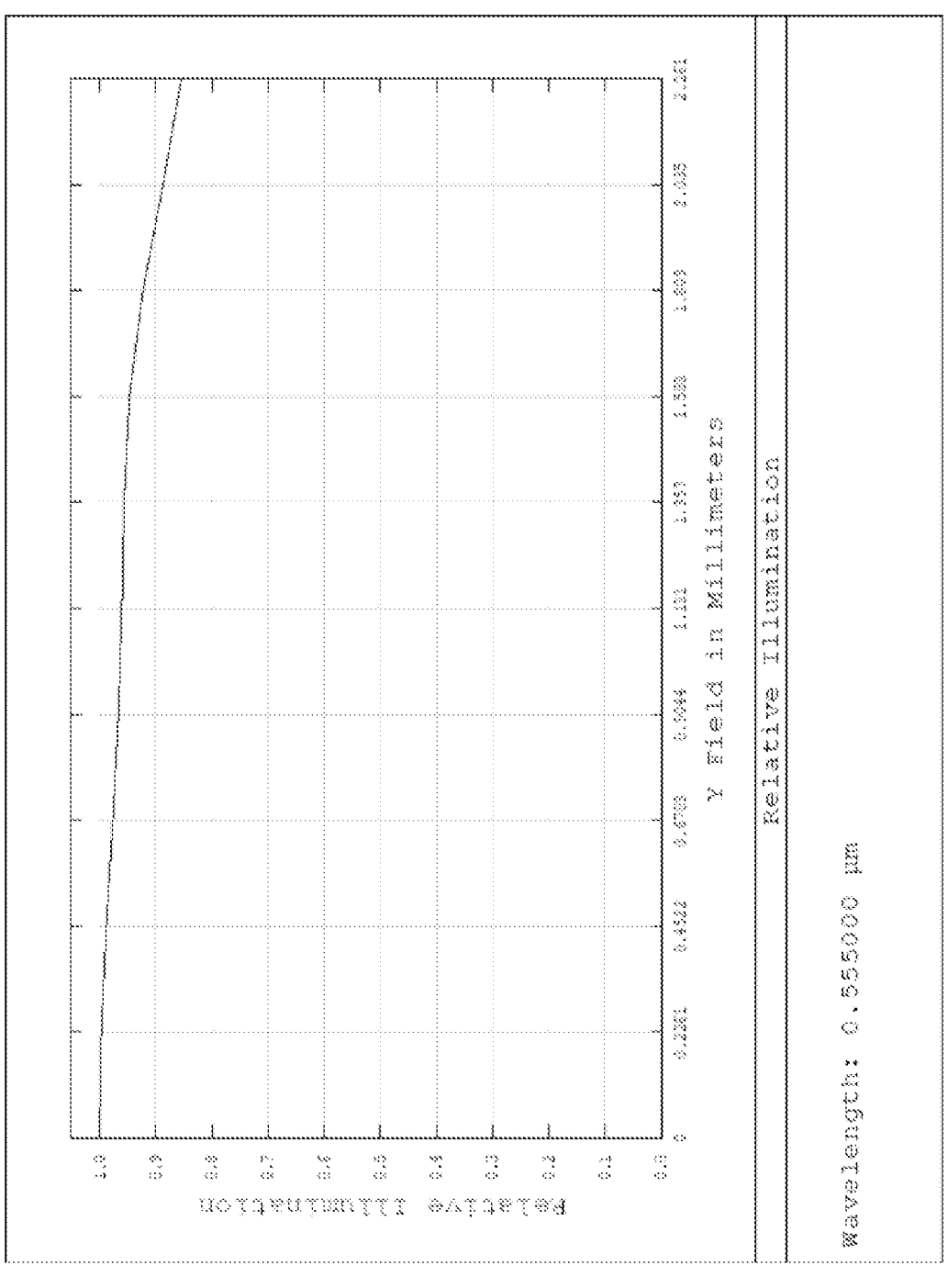
FIG. 12 is a relative illumination diagram of a 4P lens for scanner gun with long depth of field according to the third embodiment.
Figure 13:
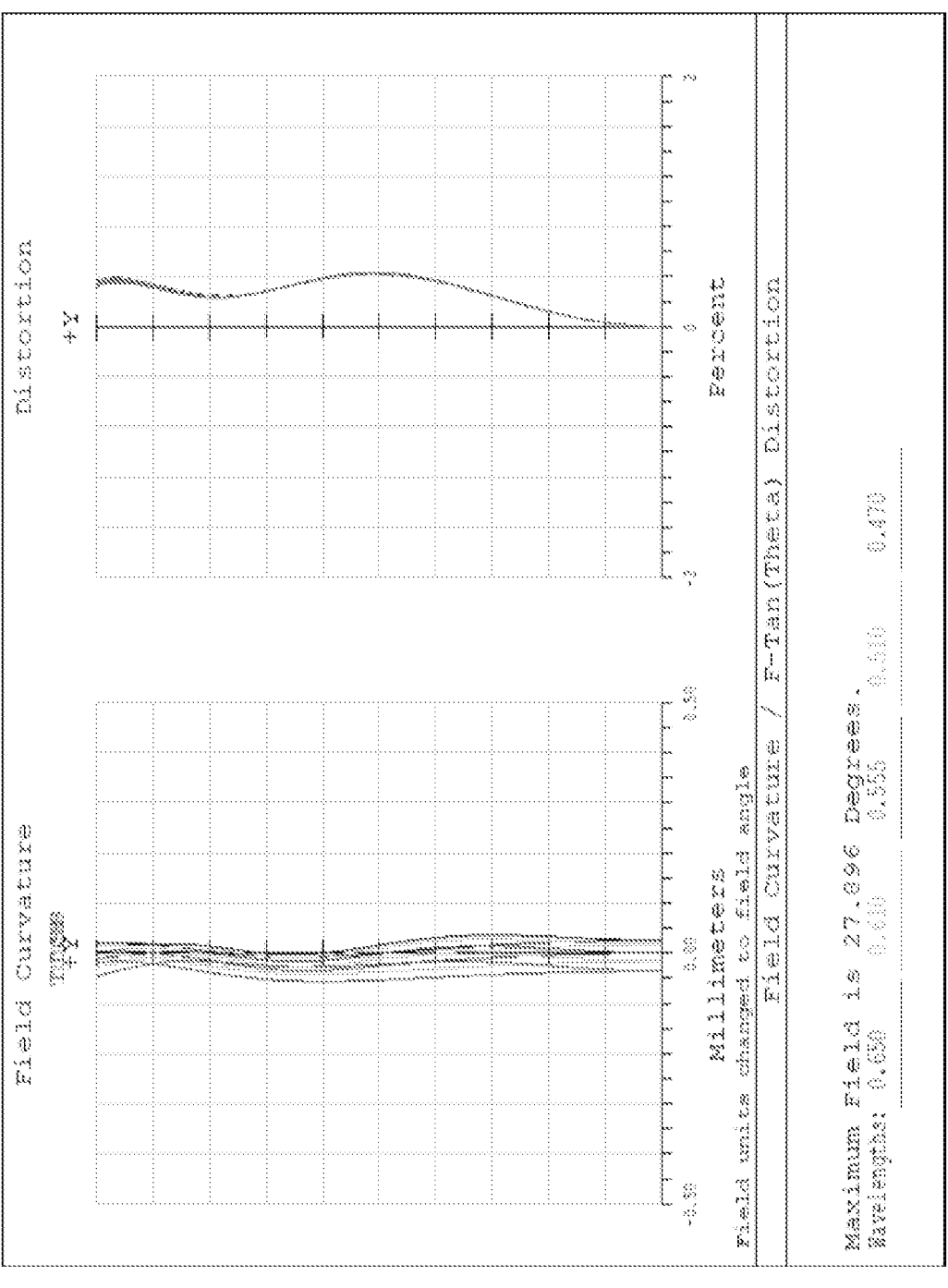
FIG. 13 is a field curvature distortion diagram of a 4P lens for scanner gun with long depth of field according to the third embodiment.
Figure 14:
FIG. 14 is a Ray fan diagram of the lens of a 4P scanner for long depth of field according to the third embodiment.
Figure 15:
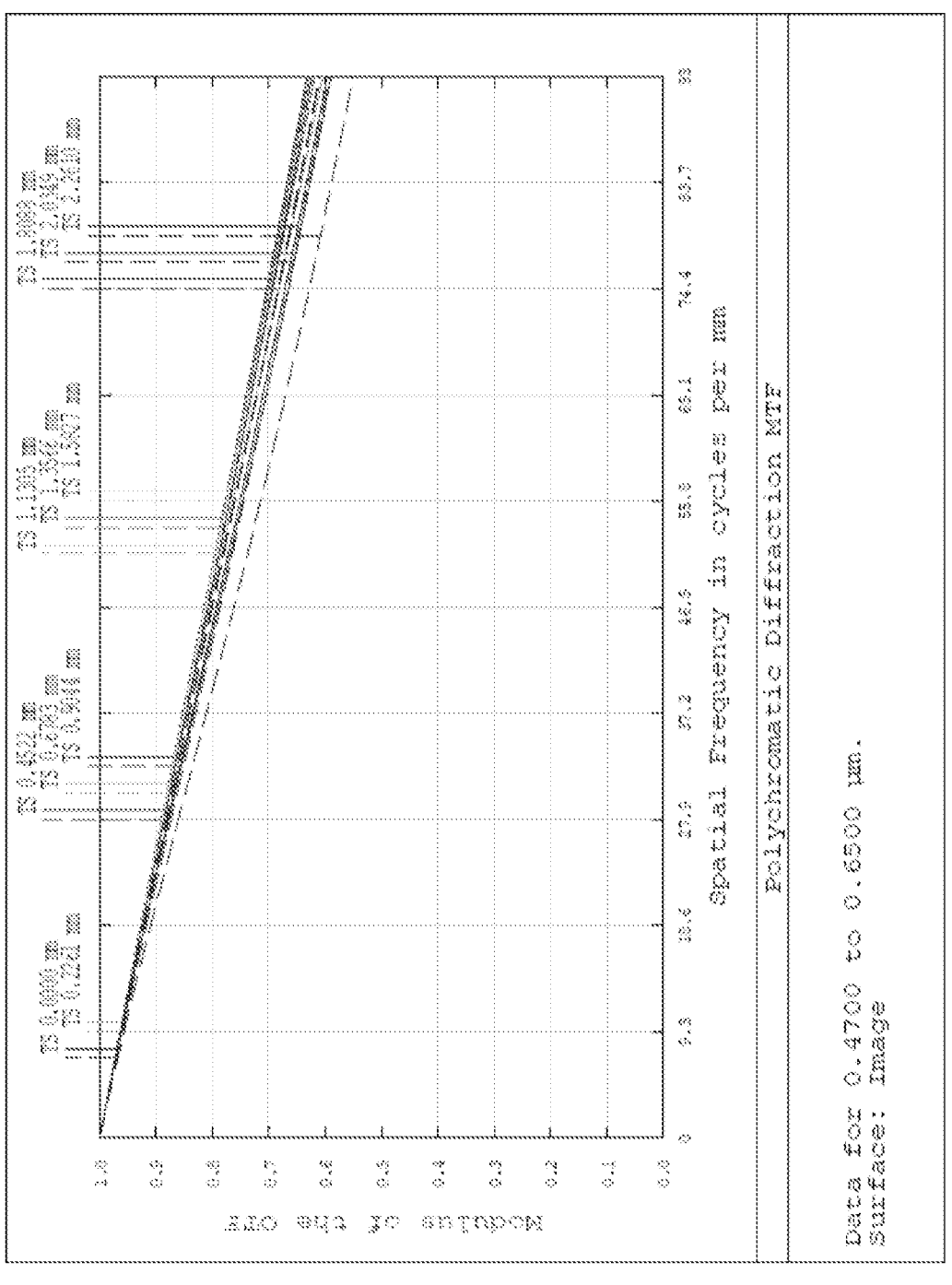
FIG. 15 is a MTF curve chart at different frequencies of a 4P lens for scanner gun with long depth of field according to the third embodiment.

FIG. 12 is a relative illumination diagram of a lens for scanner gun with long depth of field according to the third embodiment. The higher the value, the better the relative illumination. FIG. 13 is a schematic diagram of field curvature and distortion of a lens for scanner gun with long depth of field according to the third embodiment. The left side is field curvature and the right side is distortion. The closer to the center, the better the imaging effect. FIG. 14 is a Ray fan diagram of a lens for scanner gun with long depth of field according to the third embodiment The smaller the value, the better the imaging effect. FIG. 5 is a MTF curve chart of a lens for scanner gun with long depth of field according to the third embodiment at different frequencies. The smoother the curve and the higher the value, the better the imaging effect of the lens.

The application provides a lens for a 4P scanner gun with a long depth of field. It uses four lenses and selects appropriate parameters. This lens has a large depth of field, can shoot at long distances, has a strong perspective effect on the lines of the photographed object, and has high imaging clarity and high resolution.

It should be noted that in the above embodiments, each embodiment has its own emphasis in description. For parts that are not described in detail in a certain embodiment, please refer to the relevant descriptions of other embodiments.

Although the preferred embodiments of the present application have been described, those skilled in the art will be able to make additional changes and modifications to these embodiments once the basic inventive concept is understood. Therefore, it is intended that the appended claims be construed to include the preferred embodiments and all changes and modifications that fall within the scope of the application.

Obviously, those skilled in the art can make various changes and modifications to the present application without departing from the spirit and scope of the application. In this way, if these modifications and variations of the present application fall within the scope of the claims of the present application and equivalent technologies, the present application is also intended to include these modifications and variations.

What is claimed is:

1. A 4P lens for scanner gun with a long depth of field, comprising: a first lens, a second lens, an aperture stop, a third lens, and a fourth lens along an optical axis from an object side to an image side, wherein the first lens is a positive lens, with a convex surface facing the object side and a concave surface facing the image side, the second lens is a positive lens, with a convex surface facing the object side, and the third lens is a negative lens, with a concave surface facing the object side and a convex surface facing the image side, the fourth lens is a negative lens, with a concave surface facing the object side and a convex surface facing the image side;

wherein a focal length of the first lens is f1, and a total focal length of the lens is f, which meets a following condition:

$$1.4 < f1/f < 1.7;$$

wherein a following condition is met between a core thickness P3 of the third lens and the total focal length f of the lens:

$$0.11 < P3/f < 0.15;$$

wherein a following condition is met between a core thickness P4 of the fourth lens and the total focal length f of the lens:

$$0.16 < P4/f < 0.17;$$

wherein a radius of curvature of a first surface of the third lens is P3R1, and the following conditions are satisfied between it and the total focal length f of the lens:

$$0.33 < P3R1/f < 0.38;$$

wherein the first surface is an object-side surface.

2. The 4P lens for scanner gun with a long depth of field according to claim 1, wherein a combined focal length of the third lens and the fourth lens is f34 and a following condition is met between it and the total focal length of the lens:

$$0.06 < |f/f34| < 1.11.$$

3. The 4P lens for scanner gun with a long depth of field according to claim 1, wherein a distance from a center of the first lens to the image side of the first lens is a total optical length TTL of the lens, and a following condition is met between the total optical length TTL and the core thickness 1P4 of the fourth lens:

$$0.11 < P4/TTL < 0.12.$$

wherein the TTL refers to a distance from a center point of an optical axis of the first lens to an imaging plane.

\* \* \* \* \*